United States Patent [19]

Narutaki

[11] Patent Number: 5,208,642
[45] Date of Patent: May 4, 1993

[54] ELECTRO-OPTICAL DISTANCE METER

[75] Inventor: Yoshinori Narutaki, Machida, Japan

[73] Assignee: Optec Co. Ltd., Tokyo, Japan

[21] Appl. No.: 876,002

[22] Filed: Apr. 29, 1992

[51] Int. Cl.$^5$ .............................................. G01C 3/08
[52] U.S. Cl. ............................................ 356/4; 356/5
[58] Field of Search ...................... 356/4, 5, 6; 354/403

[56] References Cited

U.S. PATENT DOCUMENTS 5,002,388  3/1991  Oshishi et al. ........................... 356/5

FOREIGN PATENT DOCUMENTS 57-3063   1/1982  Japan .
60-211380 10/1985 Japan .
60-211381 10/1985 Japan .
60-211382 10/1985 Japan .
55119082  9/1988  Japan .

Primary Examiner—Mark Hellner
Attorney, Agent, or Firm—Parmelee, Bollinger & Bramblett

[57] ABSTRACT

An electro-optical distance meter has a light-emitting element that is directed through a shutter to a target and returned from the target to a photodetector. Internal and external optical paths are continuously switched by the shutter with a predetermined time ratio. The internal optical path is used for calibrating the distance being measured. The meter reduces the measurement time and enhances accuracy. In one form, the shutter comprises a disc having a C-shaped opening with an index thereon for providing a reference signal. In another form, the shutter comprises a liquid crystal switch.

11 Claims, 10 Drawing Sheets

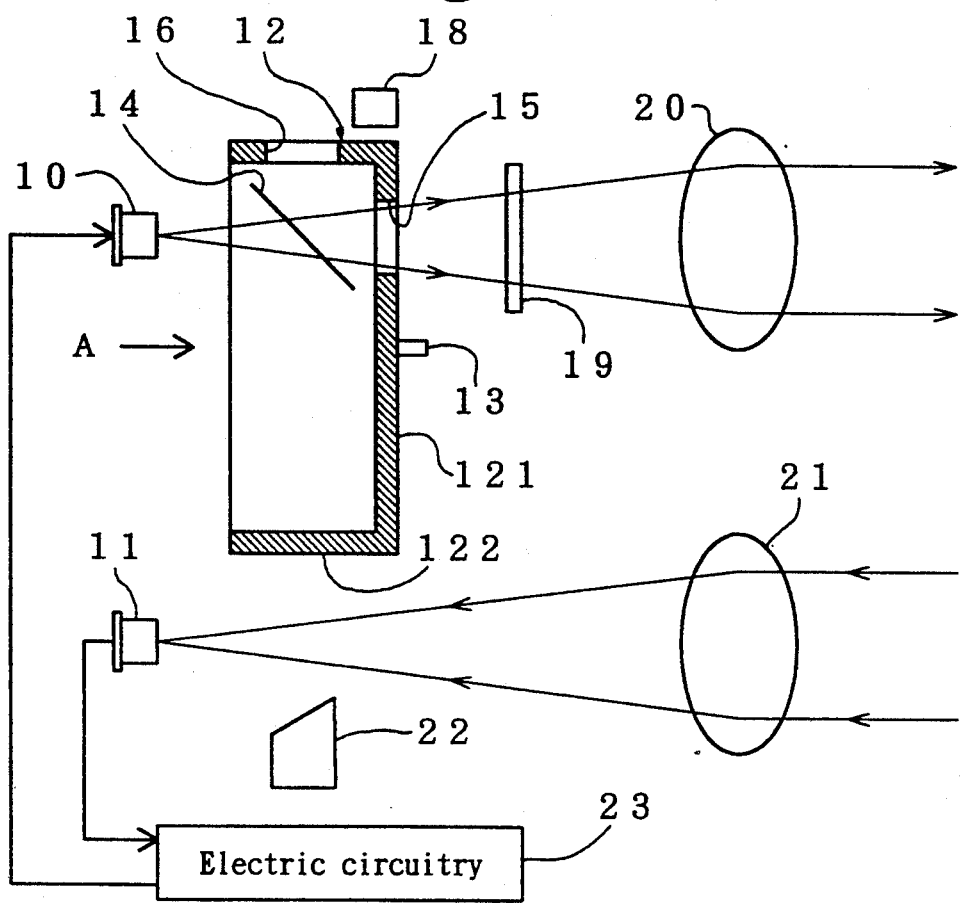
Fig. 1
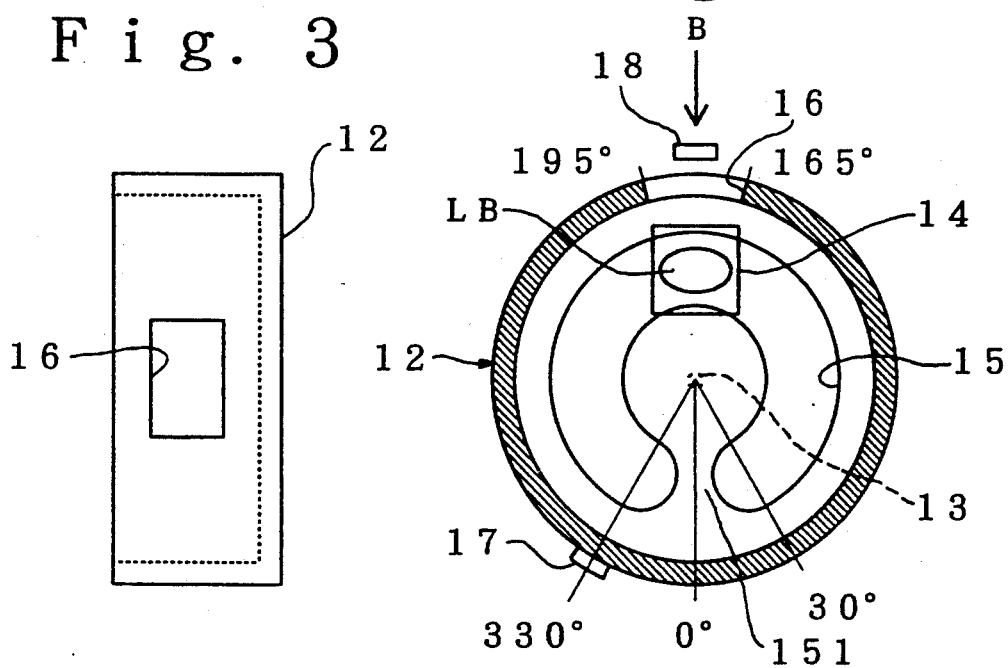
Fig. 3
Fig. 2

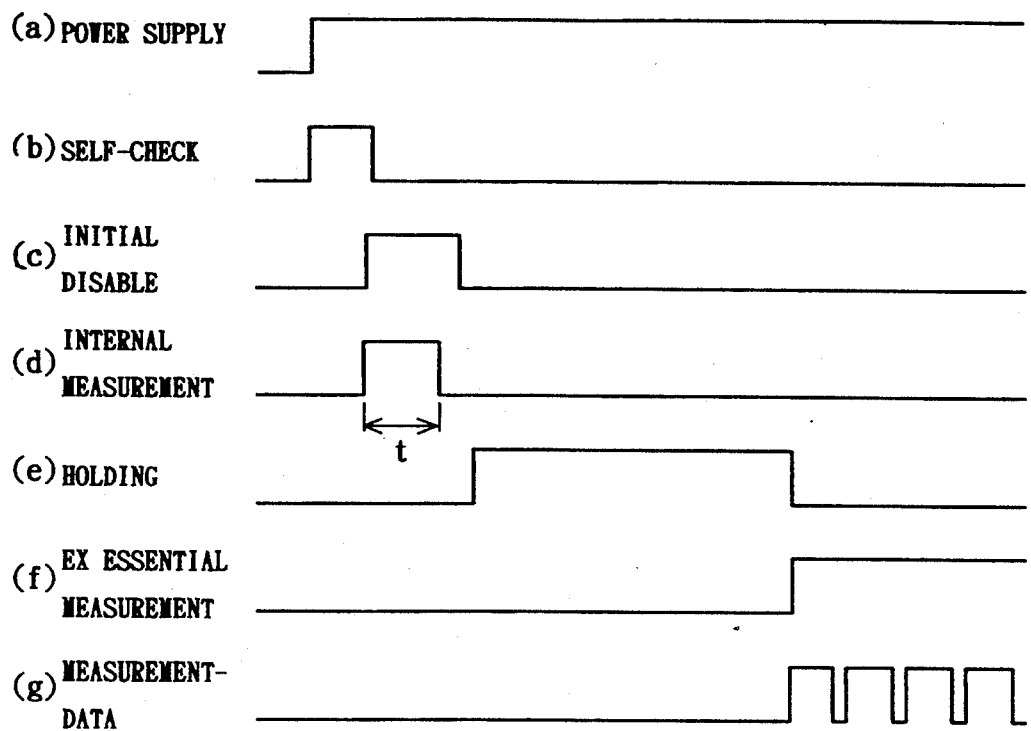
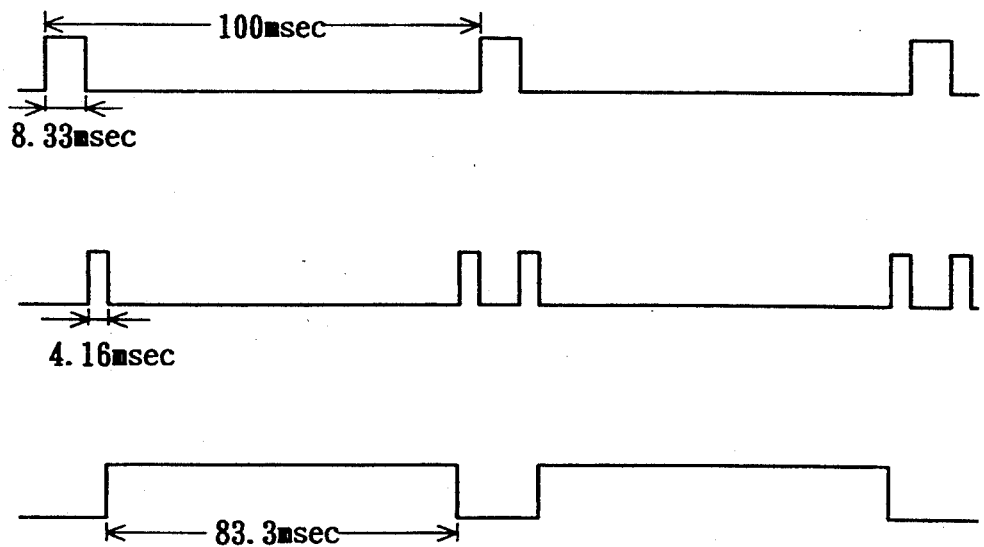

ND DISTANCE METER

ELECTRO-OPTICAL DISTANCE METER

BACKGROUND OF THE INVENTION

1. Field of the Invention

The present invention relates generally to a technique for measuring a distance by using electro-optical means and more specifically to an electro-optical distance meter that enhances accuracy of the measurement and reduces its measuring time.

2. Prior Art

FIG. 18 shows the construction of a conventional and typical Electro-optical Distance Meter (EDM). In this drawing, a light-emitting element 100 emits the light to a triangular prism 104 mounted on a target (not shown) through an object lens 102 to provide an external optical path. The light from the prism 104 is received by a photo-detector element 101 through another object lens 103 to provide its external return path. An internal optical path has a predetermined length and is used for calibrating the external path to be measured. A shutter 105 switching the external and internal optical paths is provided between the photo-elements 100, 101 and object lens 102, 103. The shutter 105 therefore comprises a disc 106 having a pair of openings 107, 107 for measuring the external path and another pair of openings 108, 108 for measuring the internal path. A drive motor 110 rotates the disc 106 intermittently to switch the external path's measurement with the internal path measurement or calibration and vice versa. An electric circuitry 111 includes a circuit for supplying to the light-emitting element 100, an electric signal having a modulated or burst frequency signal, a circuit for converting the optoelectric signal from the photo-detector 101 to a frequency or measuring signal for an operational post-processing, a circuit for comparing the phase difference between the measuring signal and the reference signal to provide another measurement, a circuit for averaging predetermined numbers of said another measurements, and a circuit for compensating the averaged external measurement with the averaged internal measurement.

FIG. 19 is a plan view showing the displacement of the openings each provided on the disc 106 of the optical paths multiplying or switching shutter 105. FIG. 20 is a side view, partially in cross-section, of the major portion of the EDM in which the disc 106 is rotated by 90° from the condition or position of FIG. 18.

In FIG. 19, a pair of the openings 107, 107 is assigned for use in the external measurement. Another pair of the openings 108, 108 is assigned for use in the internal measurement or calibration. Therefore, the disc 105 carries a trapezoidal in cross-section prism 109 having ends in alignment with the openings 108, 108 respectively as shown in FIG. 20.

Upon the external measurement, the openings 107, 107 are pivoted oppose to the light-emitting element 100 and photo-detector 101, respectively, so that the opening 107 transmits the light from the element 100 through the object lens 102 to the target prism 104 in the atmosphere, and that the return light after being reflected by the prism 104 is received by the photo-detector 101 through the object lens 103 and the opening 107. Upon the internal measurement, the openings 108, 108 are pivoted oppose to the light-emitting element 100 and photo-detector 101, respectively, so that the opening 108 transmits the light from the element 100 to one end of the trapezoidal prism 109, and that the return light after being reflected by the prism 109 is received by the photo-detector 101 through the opening 108.

FIG. 21 shows a concrete example of the measuring sequence in the conventional EDM. At first step 201, the shutter 105 is positioned as shown in FIG. 18 to emit the 15 MHz modulating light within 666 milliseconds to the target to provide a plurality of the external measurements. In next step 202, the drive motor 110 is energized to switch the shutter 105 to a second position shown in FIG. 20. It takes about a half second to switch the shutter. In step 203, the 15 MHz modulating light is passed through the trapezoidal prism 109 within 666 milliseconds under the second position to provide a plurality of the internal measurements. In step 204, a frequency selector in the electric circuitry 111 switches its modulating frequency signal to a 150 KHz modulating signal. It takes about 0.2 second to switch the frequency. In step 205, a plurality of second internal measurements are performed in same manner as in step 203 under the second position. In step 206, the shutter 105 is rotated angularly by spending about a half second. Finally, in step 207, a plurality of the 150 KHz external measurements are performed in a similar manner. Then, the 15 MHz or 150 KHz external or internal measurements are averaged to provide an averaged 15 MHz or 150 KHz external or internal measurement, respectively. The 15 MHz or 150 KHz averaged external value is subtracted by the corresponding averaged internal value to provide a 15 MHz or 150 KHz net measurement.

The 15 MHz and 150 KHz modulating frequencies are employed because a coarse measurement is provided with the 150 KHz frequency having a long wavelength or scale, while a fine measurement is provided with the 15 MHz frequency having a short wavelength or scale. As the each measuring time in the respective measurements is set to be 666 milliseconds, 10,000 times sampling measurements are provided. Therefore, the total measuring time in the conventional method is about 3.86 seconds among which about one second is exhausted with the twice shutter switching.

As described above, in the conventional EDM, the measurement modes are performed in a batch fashion, and the disc 106 of the shutter 105 switching the optical paths is angular driven to switch the measurement modes. Then, the measurements are interrupted in long time for switching the modes. The total measurement time is also increased. Therefore, there are some problems in which the EDM can not trace the target to be moved, and its accuracy and reliability are reduced.

SUMMARY OF THE INVENTION

In view of the above problem, it is an object of the present invention to provide an Electro-optical Distance Meter that enhances accuracy of the measurement and reduces its measuring time.

It is another object to provide an Electro-optical Distance Meter comprising an optical path switching mechanical shutter being rotated with a uniform velocity to switch an external and internal optical path with a predetermined time ratio.

It is still another object to provide an Electro-optical Distance Meter comprising an optical path switching electrical or Liquid Crystal Device (LCD) shutter for switching an external and internal optical path having a predetermined time ratio.

According to an aspect of the present invention, an Electro-optical Distance Meter comprises:

a light-emitting element emitting a modulating light to a target through a lens to provide an external optical path;

a photo-detector element receiving the return light from said target through another lens to provide an external return optical path;

an internal optical path having a predetermined length and being used for calibrating said external path to be measured;

a rotating shutter for switching said external and internal optical paths being disposed between said elements and said lens, and comprising a disc having a C-shaped opening and an index corresponding to a leading angular position of said C-shaped opening;

a dichroic means disposed in alignment with said shutter have a predetermined inclined angle to the axis of said light-emitting element;

a stationary means for detecting said index of said rotating disc; and an electric control means operatively connected to said elements and stationary means to produce a time ratio of said external measurement to said internal measurement.

BRIEF DESCRIPTION OF THE ACCOMPANYING DRAWINGS

A better understanding of the present invention can be obtained when the following detailed descriptions of the preferred embodiments are considered in conjunction with following drawings, in which:

FIG. 1 is a schematic side view, partially in cross section, of a first embodiment of an Electro-optical Distance Meter (EDM) according to the present invention;

FIG. 2 is a view, partially in cross section, of an optical path switching shutter in the direction of the arrow A in FIG. 1;

FIG. 3 is a view of the shutter in the direction of the arrow B in FIG. 2;

FIG. 7 is a timing chart explaining the operation of the electro-optical distance meter as shown in FIG. 1;

FIG. 8 is a timing chart showing the relation between an external measurement and an internal measurement given to the first embodiment of the shutter;

DESCRIPTION OF THE PREFERRED EMBODIMENT

Figure 4:
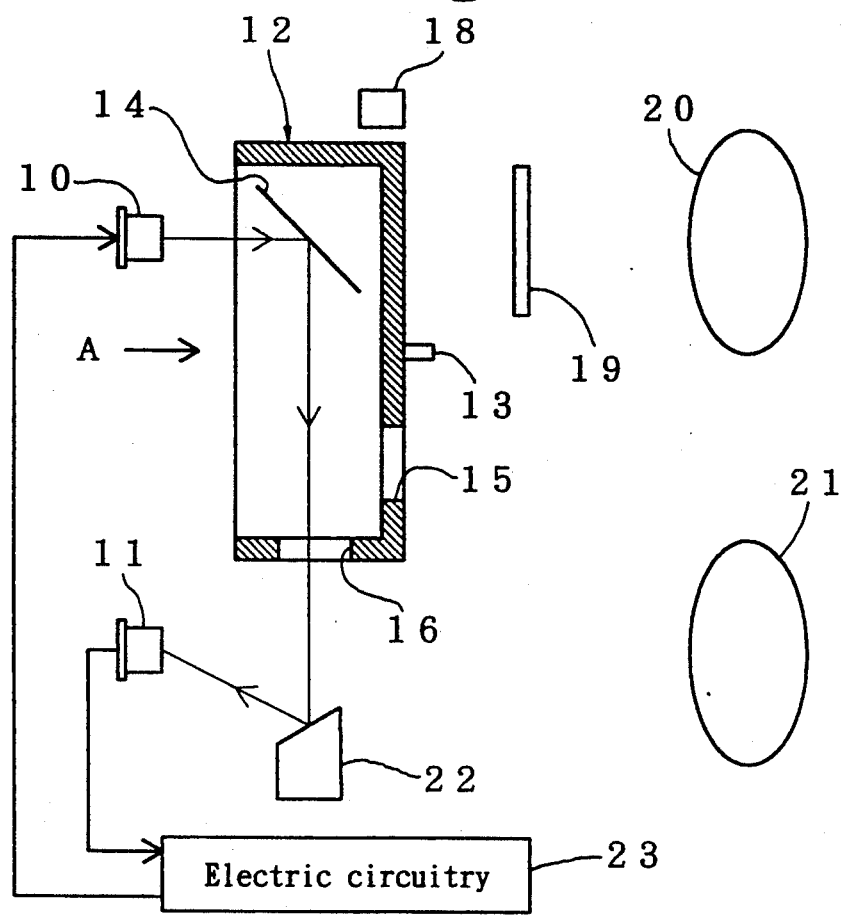
FIG. 4 is a schematic side view, partially in cross section, of the EDM in which the shutter is rotated by predetermined angle or 180° from the position of FIG. 1.

FIG. 1 is a side view, partially in cross section, of an embodiment of the present invention schematically showing an Electro-optical Distance Meter (EDM). In this drawing, a light-emitting element 10, such as a light-emitting diode, emits the light or infra-red beam to a triangular prism (not shown) mounted on a target (not shown) through a filter 19 and an object lens 20 to provide an external optical path. The filter 19 adjusts the light intensity to be passed through. The return beam is received by a photo-detector 11, such as a photo-transistor, through another object lens 21 to provide its external return path. An internal optical path has a predetermined length and is used for calibrating the external path to be measured. A continuous rotatable shutter 12 according to the present invention is provided to switch the external and internal optical paths.

The shutter 12 comprises a disc 121 connected to a rotatable shaft 13 at its center and a cylindrical member 122 having a rim secured or integrated with a periphery of the disc 121. The shutter 12 is driven by a motor (not shown) to rotate continuously with an equiangular speed. A stationary dichroic or half mirror 14 is disposed in the shutter 12 with a predetermined inclined angle, e.g., 45° to the axis of the element 10. A horseshoe or C-shaped opening 15 is provided on the disc 121 as shown in FIG. 2 for an external measurement. The generally C-shaped opening 15 is started from a 30° angular position of the disc 121 and terminated to its 330° position to provide a masking portion 151 and a 300° arc. The opening 15 is preferably started at its 20° position and terminated at its 340° position considering the distance between outer and inner sides or arcs. A rectangular opening 16 is also provided from 165° to 195° on the cylindrical member 122 as shown in FIGS. 2 and 3 for an internal measurement. The cycle or time required for one rotation of the shutter 12 is assumed to be T, and T×0.833 (300/360) assigns the external measuring time within which the beam from the external opening 15 is emitted to the object lens 20. Also, T×0.0833 (30/360) assigns the internal measuring time within which the beam from the internal opening 16 is emitted to the photo-detector 11 via a reflector 22.

FIG. 2 is a view, partially in cross section, of the shutter 12 in the direction of the arrow A in FIG. 1. An index or magnet 17 is mounted on the cylinder 122 in alignment with the leading edge of the opening 15, for example, at a 330° angular position of the shutter 12 to index the start position of the cycle of the rotating shutter 12. The rotating shutter 12 carries the magnet 17. A stationary magnetic sensor 18 is disposed adjacent to the 180° angular position of the shutter 12 to detect the angular position or timing of the shutter 12, and then to detect the leading edge of the opening 15. In FIG. 2, LB denotes the light beam.

FIGS. 1 to 3 show a first condition of the external measurement. When an external measurement is made, major portions of the light LB from the element 10 are emitted through the half mirror 14 and opening 15 to the object lens 20. The return light reflected from the target (not shown) is received by the photo-detector 11 through the another object lens 21. The minor potion of the light reflected from the mirror 14 is shielded by the inner face of the member 122.

Figure 5:
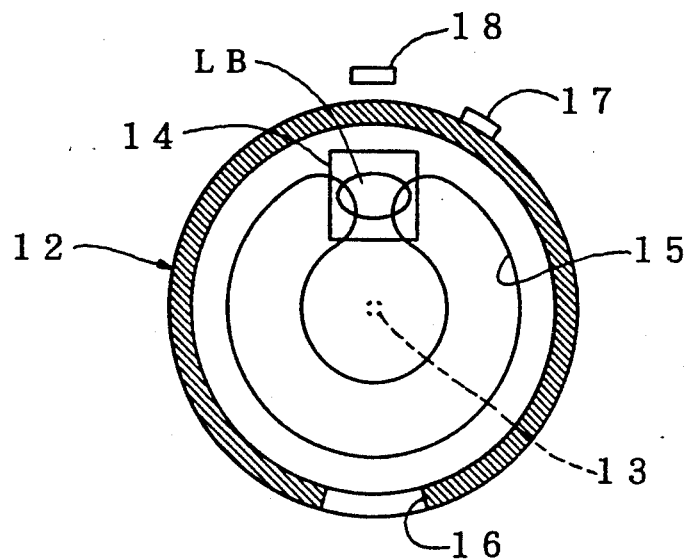
FIG. 5 is a view, partially in cross section, of the optical path switching shutter in the direction of the arrow A in FIG. 4.

FIGS. 4 and 5 show a second condition of the internal measurement in which the shutter 12 is rotated by 180° from the first condition. When an internal measurement is made, major portions of the light LB from the element 10 through the half mirror 14 are shielded by the inner face of the disc 121. The minor potion of the light reflected from the mirror 14 is emitted through the opening 16 to the reflector 22 and then to the photo-detector 11.

As described above, the optical path switching shutter 12 according to the first embodiment is rotated continuously with a uniform angular velocity around the axis 13 with the time ratio of 10 to 1 being the external measuring time to the internal measuring time per one rotation or cycle.

Figure 6:
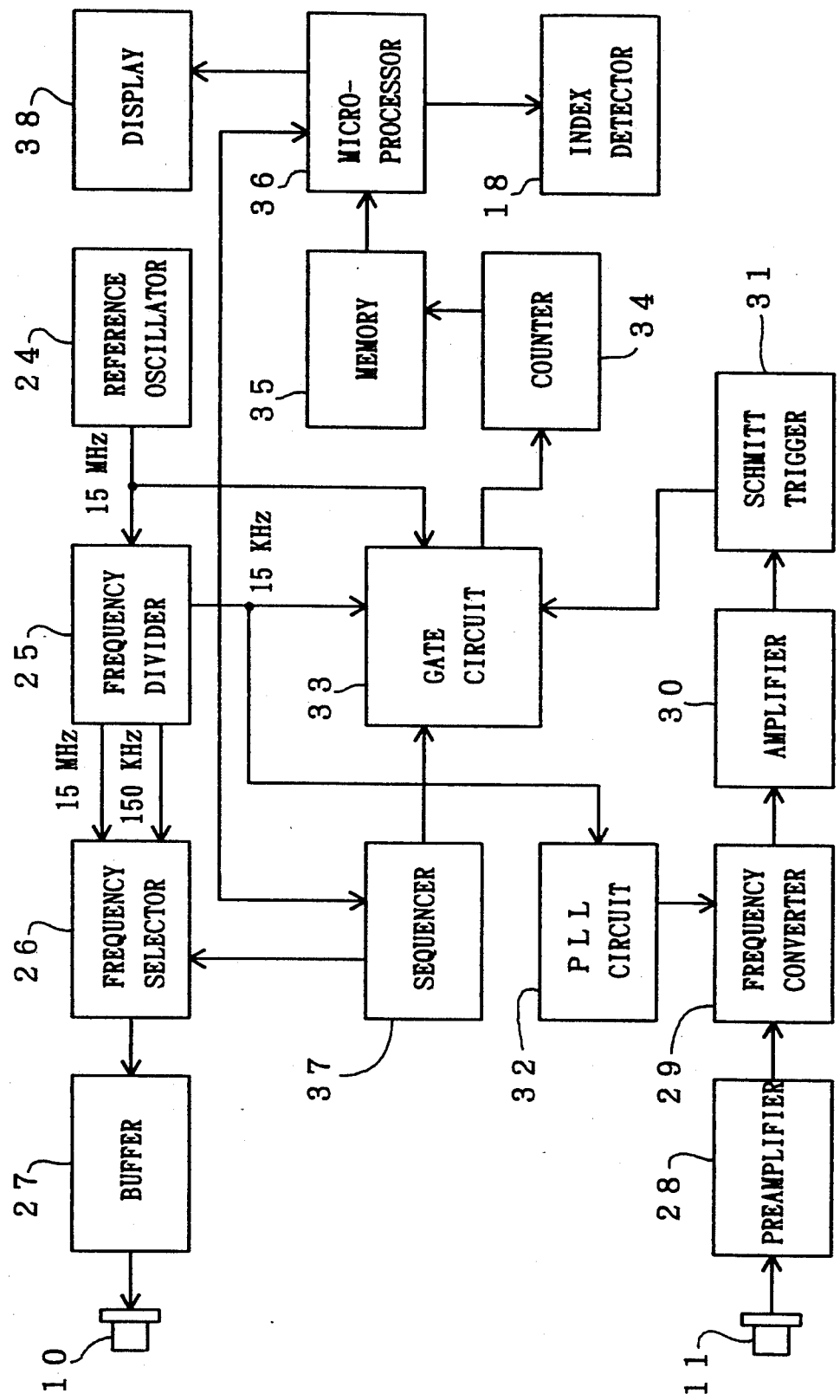
FIG. 6 is a block diagram showing an embodiment of an electric circuitry as shown in FIG. 1.

FIG. 6 is a block diagram showing a construction of an electric circuitry 23 according to the first embodiment. The electric circuitry 23 comprises a transmitter (24 to 27 and 10) transmitting a modulating signal, a receiver (11 and 28 to 32) for receiving the modulating signal to be measured, a controller (33 to 37), a display 38 and the angular index detector 18.

The transmitter includes a reference oscillator 24 for generating the 15 MHz signal. The 15 MHz signal is supplied to a frequency divider 25 and a gate circuit 33. The frequency divider 25 divides the 15 MHz signal into 15 MHz and 150 KHz modulating signals and a 15 KHz signal. The 150 KHz signal is supplied to a frequency selector 26 as well as the 15 MHz modulating frequency signal. The 15 KHz signal is supplied to a Phase Lock Loop (PLL) circuit 32 and the gate circuit 33. The selector 26 selects the 15 MHz or 150 KHz Signal under the control of a sequencer 37. Therefore, the modulating signal having a suitable frequency is supplied to the light-emitting element 10 through a buffer or driver 27.

The receiver includes the photo-detector 11 that receives the light returned from the target, or the internal or calibration path light. The detected signal is amplified by a preamplifier 28 and then supplied to a frequency converter 29. The converter 29 mixes the detected signal with a PLL signal from the PLL circuit 32 to produce a beat signal. The PLL circuit 32 serves as a local oscillator and supplies a constant frequency (or the received frequency plus 15 KHz) to the converter 29. The beat signal is amplified by an amplifier 30 and then converted to pulses or a digital signal by a Schmitt trigger circuit 31.

The controller includes the gate circuit 33 that additionally receives the pulses or digital signal from the Schmitt trigger 31, and a sequence control signal from the sequencer 37. The gate circuit 33 receives the 15 KHz signal from the divider 25 as a reference signal and the 15 KHz signal from the Schmitt circuit 31 as a measured signal. The gate circuit 22 outputs the 15 MHz signal from the oscillator 24 within the range or period corresponding to the phase difference between the two 15 KHz signals. The phase difference is equal to a measurement value per one sample, and represents the period or its one Nth from the emitting time of the modulating light at the light emitting diode or element to the return time the where the N is a positive integer. The return time is defined when the modulating light reaches the photo-detector after being reflected from the target to be measured. A counter 34 counts the 15 MHz signal passing through the gate circuit 33 and outputs its counted value to a memory 35 with predetermined timing. The memory 35 includes a first memory area for storing the external measurements and a second memory area for storing the internal measurements. The data or internal and external measurements in the memory 35 are stored to a microprocessor 36 for the predetermined cycle or when the optical path switching shutter 12 is rotated by, for example, one rotation or 360°. The microprocessor 36 compensates or calibrates the external measurement with the internal measurement to produce a net measurement. The net value is indicated on the LCD or 7 segments' display 38. The microprocessor 36 also receives a timing or index signal representing the phase angle of the shutter 12, from the angular index detector or magnetic sensor 18 as an interrupt signal. The microprocessor 36 further accesses the sequencer 37 to provide a suitable control.

FIG. 7 is a timing chart explaining the EDM operation after turning on a power supply until the essential measurement commences. When the power supply turns on shown in FIG. 7a, the microprocessor 36 carries out a self-checking program in the computer system or the EDM as shown in FIG. 7b. During the initial disable period inhibiting the external measurement shown in FIG. 7c, the internal measurements are performed to store several calibration values to the internal memory areas in the memory 35 shown in FIG. 7d. This internal measurement storing period t is determined so that the number of measurements to be stored is equal to that of the external measurements to be obtained within one measuring cycle in the essential measurement. Then, a commencing command for the essential measurement is given as shown in FIG. 7f after taking a predetermined holding time shown in FIG. 7e. In response to the commencing command, the essential measurement commences and the external and internal measurements in the respective measuring cycle are performed in timesharing fashion with the predetermined time ratio, for example, 10 to 1 shown in FIG. 7g.

FIG. 8 is a timing chart showing a timing between the external measurement and internal measurement in the present embodiment. When the rotation rate of the shutter 12 is set for be 10 Rotations Per Second or 600 RPM, the time required to one rotation of the shutter 12 is 100 milliseconds in which 8.33 milliseconds are assigned for the internal measurement. Contrary, 83.3 milliseconds are assigned for the external measurement. In the present embodiment, as the frequencies of the reference and measuring signals are set to be 15 KHz, the sampling frequency is 15 KHz and the sampling cycle is 66.7 microseconds. Therefore, 100 samples take 6.67 milliseconds and can be performed within 8.33 milliseconds of the internal measuring time. The 1000 samples take 66.7 milliseconds and can be performed within the 83.3 milliseconds of the external measuring time.

Figure 9:
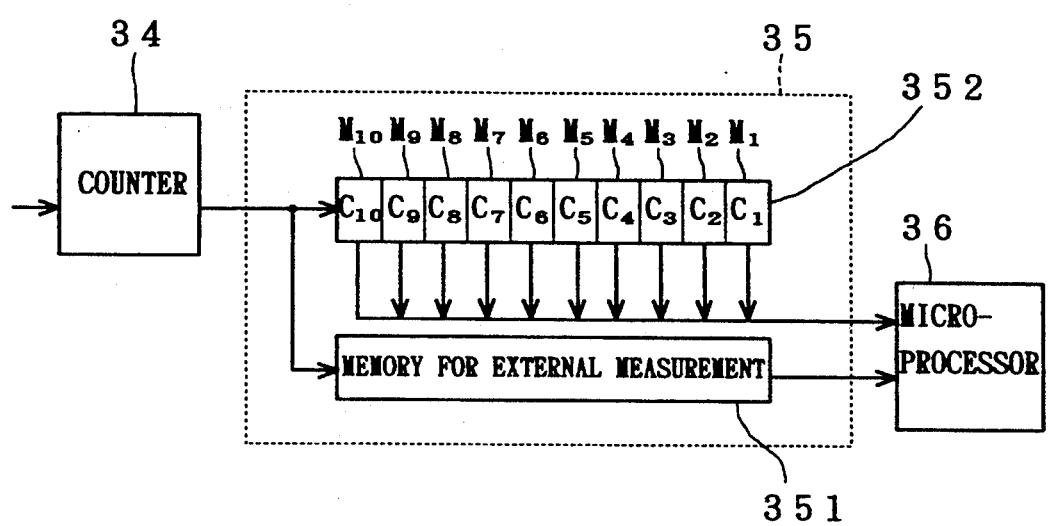
FIG. 9 is a block diagram of a memory of FIG. 6.

FIG. 9 shows an exemplified construction of the memory 35 according to an embodiment. The memory 35 comprises first memory area 351 for storing the external measurements and a second memory area 352 for storing the internal measurements. The external memory area 351 is so constructed to store the accumulated counter value or external measurement data of the 1000 samples. The internal memory area 352 has 10 memory blocks M1 to M10, with respective memory block Mi being so constructed to store the accumulated counter value or internal measurement data Cj of the 100 samples where i is an integer among 1 and 10 and j is a positive integer.

In the operation for storing the internal measurements shown in FIG. 7d after turning on the power supply, 100 samples of the internal measurement data C1, C2, etc., are obtained per one rotation of the shutter 12. The internal measurement data C1 to C10 corresponding to the 10 rotations of the shutter 12 (1000 samples) are stored to the blocks M1 to M10, respectively, in the memory area 352.

When the essential measurement commences as shown in FIG. 7g, 100 samples of the internal measurement data C11 (C12, etc.) and 1000 samples of the external measurements are obtained per one rotation of the shutter 12 (or per each measuring cycle) by the counter 34. The 1000 samples of the external measurement data are stored in the first memory area 351. All the data in the memory area 351 is updated.

In contrast, the 100 samples of the internal measurement data C11 (C12, etc.) are stored in the second memory area 352. One block in the memory area 352 is updated. Therefore, the second memory area 352 employs, for example, a 16 bit wide 10 stage shift register or a 16 bit wide 10 memory array. The outputs of the memory blocks M1 to M10 are added by an adder (not shown) to produce a transferring average of the 1000 samples of the internal measurement data.

The microprocessor 36 reads the updated external measuring data in the first memory area 351 and partial updated internal measuring data in the second memory area 352. The microprocessor 36 then calibrates the average of the external measurements with the transferring average of the internal measurements based on the data to produce the net distance measurement to be operated. The operated distance measurement is displayed on the display 38.

Figure 10:
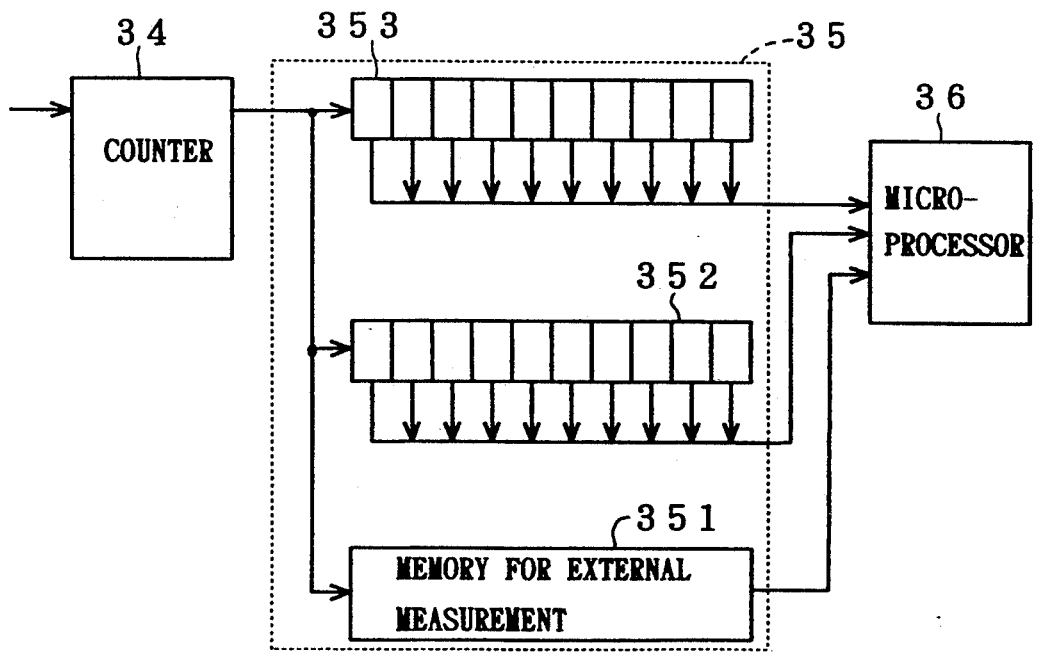
FIG. 10 is a block diagram of another embodiment of the memory of FIG. 6.

FIG. 10 shows another construction of the memory 35 suitable for use in two measuring frequencies. The memory comprises the first memory area 351, the second memory area 352 for storing the 15 MHz internal measurements and a third memory area 353 for storing the 150 KHz internal measurements. Each of the internal memory areas 352 and 353 has 10 memory blocks, with respective memory blocks being so constructed to store the accumulated counter value or internal measurement data of the 100 samples. In the operation for storing the internal measurements after turning on the power supply, 1000 samples of the 15 MHz internal measurement data are stored in second memory area 352 during ten rotations of the shutter 12. Then, 1000 samples of the 150 KHz internal measurement data are stored in the third memory area 353 during next the ten rotations of the shutter 12. When the essential measurement commences, after setting the modulating frequency to be 15 MHz, the internal and external 15 MHz measurements are performed during the first rotation of the shutter. Then, the transferring average of the 15 MHz internal measurement is obtained from the second memory area 352 while the average of the 15 MHz external measurement is obtained from the first memory area 351. After setting the modulating frequency to be 150 KHz, the internal and external 150 KHz measurements are performed during the next rotation of the shutter. Then, the transferring average of the 150 KHz internal measurement is obtained from the third memory area 353 while the average of the 150 KHz external measurement is obtained from the first memory area 351. The above operations are repeated upon performing a plurality of the measuring cycles. In case of two different frequency measurements, one measuring cycle is carried out with two rotations of the shutter 12. When numerous measuring cycles are performed, it is possible to prune the time of the measuring having any frequency (for example 150 KHz measuring) if necessary.

Figure 11:
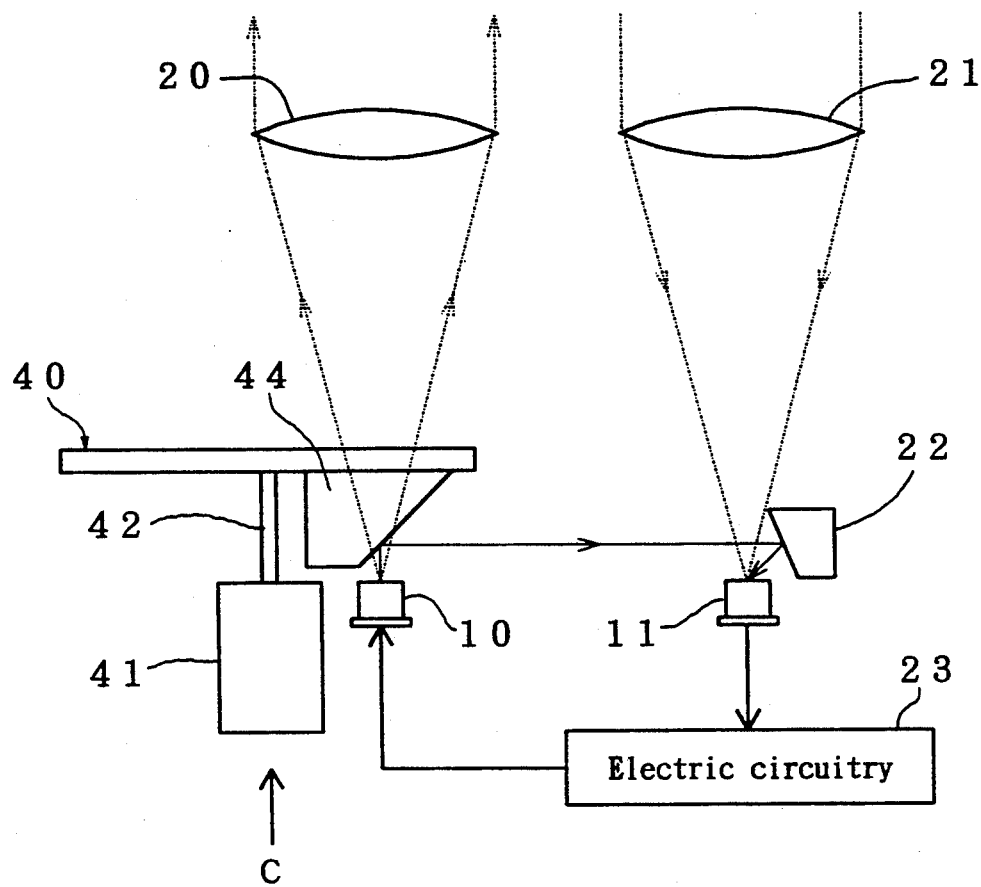
FIG. 11 is a schematic side view of a second embodiment of the EDM with a modified optical path switching shutter.
Figure 12:
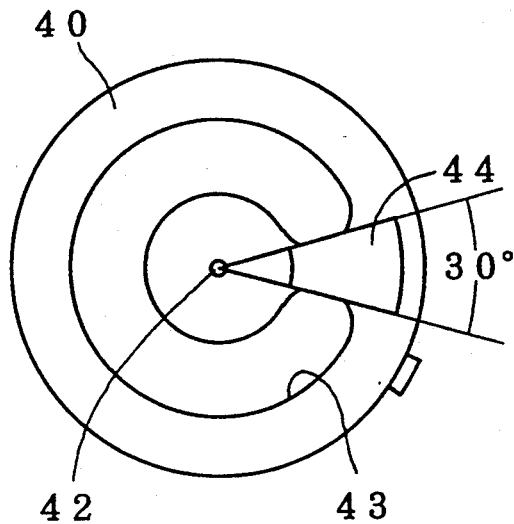
FIG. 12 is a view of the shutter in the direction of the arrow C in FIG. 11.
Figure 13:
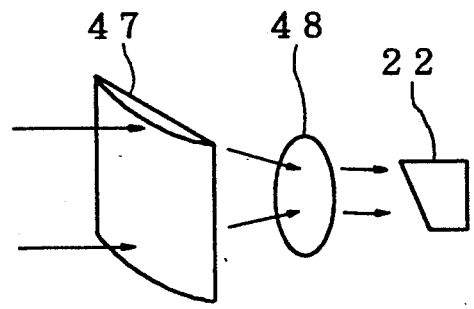
FIG. 13 is a modified embodiment of the internal optical path of FIG. 11.

FIG. 11 shows a schematic side view of a second embodiment of a modified optical path switching shutter 40. FIG. 12 is a view of the shutter 40 in the direction of the arrow C in FIG. 11. FIG. 13 is a modified embodiment of the internal optical path. In these and the following drawings, the same reference numerals are used to denote the same parts or members as those used in the embodiment shown in FIG. 1, and detailed descriptions thereof are omitted.

In FIG. 11, the shutter 40 having a disc shape is so constructed to be rotated continuously with a uniform angular velocity around the axis or shaft 42 by a drive motor 41. In this disc shutter 40, a C-shaped opening 43 having a predetermined angular range (e.g., 300° plus the angle corresponding to its width) is provided within its two concentric rings as the opening for the external measurement as the shutter 12 as shown in FIG. 1. On the face of the disc 40 oppose to the light-emitting diode 10, a surface reflecting mirror or a truncated conic sector 44 is mounted at the remaining portion of the rings in alignment with the rotating axis 42. The curved mirror 44 is made from a truncated conic ring material or glass, on which a high reflective material or vapor is applied or deposited. Therefore, upon rotating the shutter 40, the beam from the element 10 is emitted constantly to the photo-detector 11 through the mirror 44 and reflector 22 during the internal measurement.

Alternatively, a prism having a gradient of 45° may be employed instead of the truncated conic sector mirror 44, in combination with cylindrical and convex lenses 47 and 48 each disposed between the prism and reflector 22 as shown in FIG. 13.

Figure 14:
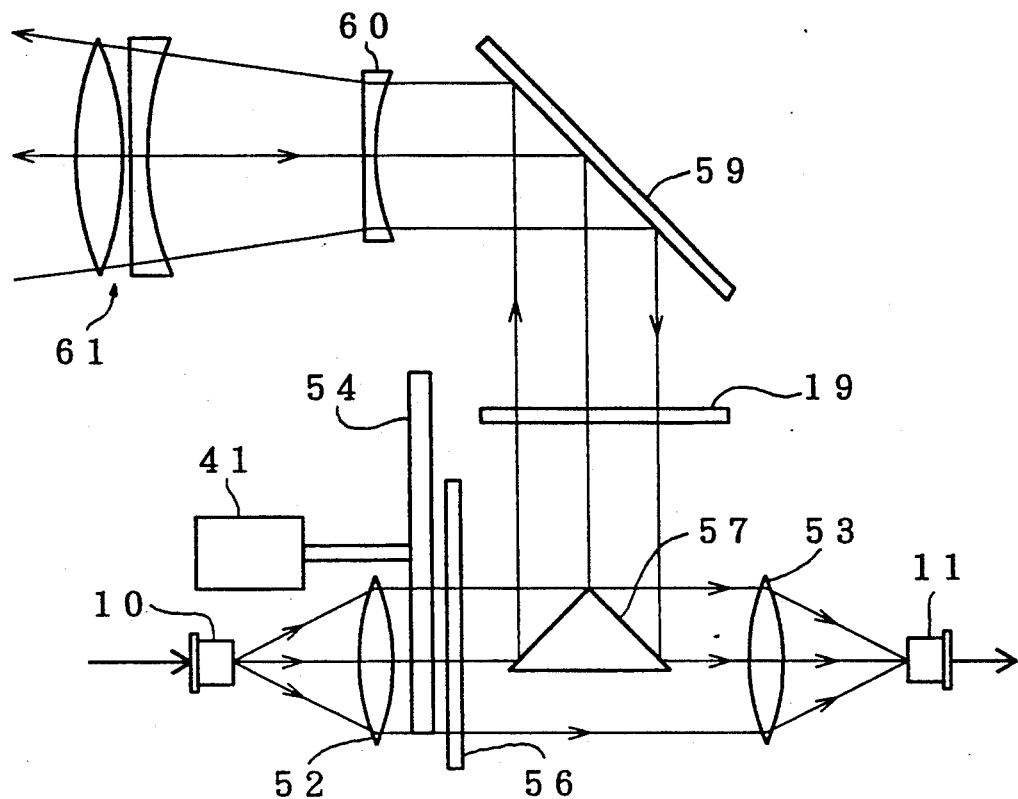
FIG. 14 is a schematic view, partially in cross section, of a third embodiment of the EDM with another modified optical path switching shutter.
Figure 15:
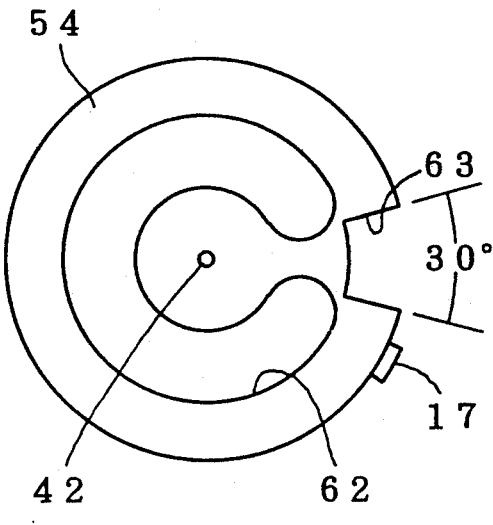
FIG. 15 is a back view of the shutter of FIG. 14.
Figure 16:
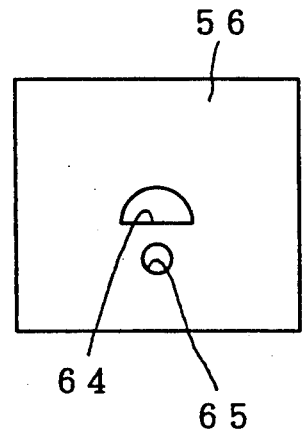
FIG. 16 is a plan view of the mask shown in FIG. 14.

FIG. 14 is a schematic view, partially in cross section, of a third embodiment of an optical path switching shutter 54. FIG. 15 is a plan view of the shutter 54. FIG. 16 is a plan view of an optical path mask 56.

In FIG. 14, 52 denotes a condenser lens in alignment with the axis of the light-emitting diode 10; 53, a focus lens for the photo-detector 11; 57, a prism or beam splitter; 59, a mirror; and 60 and 61, a telescopic lens system. The shutter 54 having a general disc shape is so constructed to be rotated continuously with uniform velocity by the drive motor 41. In this disc shutter 54, a C-shaped opening 62 having a predetermined angular range (e.g., 300° plus the angle corresponding to its width) is provided within its two concentric rings for the external measurement. A groove 63 is provided on the disc 54 at the remaining sector (for example 30° range) of the opening in alignment with the outer ring as shown in FIG. 15. The stationary (optical path) mask 56 is disposed in front of the rotating shutter 54. A semicircular opening 64 for the external measurement is provided on the mask 56 as shown in FIG. 16 in alignment with the opening 62. The opening 64 may have a straight side perpendicular to and in contact with the common optical axis of the light emitting element 10, lenses 52 and 53, and photo-detector 11. Another opening 65 for the internal measurement is provided on the mask 56 corresponding to the groove 63 of the shutter 54.

When the C-shaped opening 62 of the rotating shutter 54 faces the semicircular opening 64 during the external measurement, the upper half light beam from the light-emitting element 10 emits to the target (not shown) through the shutter 54, mask 56, beam splitter 57, light density adjustable filter 19 and telescopic lens system 61. The return beam from the target is radiated to the photo-detector 11 through the lens system 61, filter 19, beam splitter 57 and lens 53. In contrast, the lower half light beam is shielded by the outer portion of the disc shutter 54 from its outer ring.

The upper half light beam is shielded by the remaining portion of the disc shutter 54 between its rings when the groove 63 of the rotating shutter 54 faces the opening 65 during the internal measurement. The lower half light beam is passed to the photo-detector 11 through the shutter 54, mask 56 and lens 53. Therefore, the time ratio of the external to internal measurements is equal to 10 to 1 per one cycle or one rotation of the shutter 54, when the angular ranges of the C-shaped opening 62 and groove 63 are set to be 300° and 30° respectively.

Figure 17:
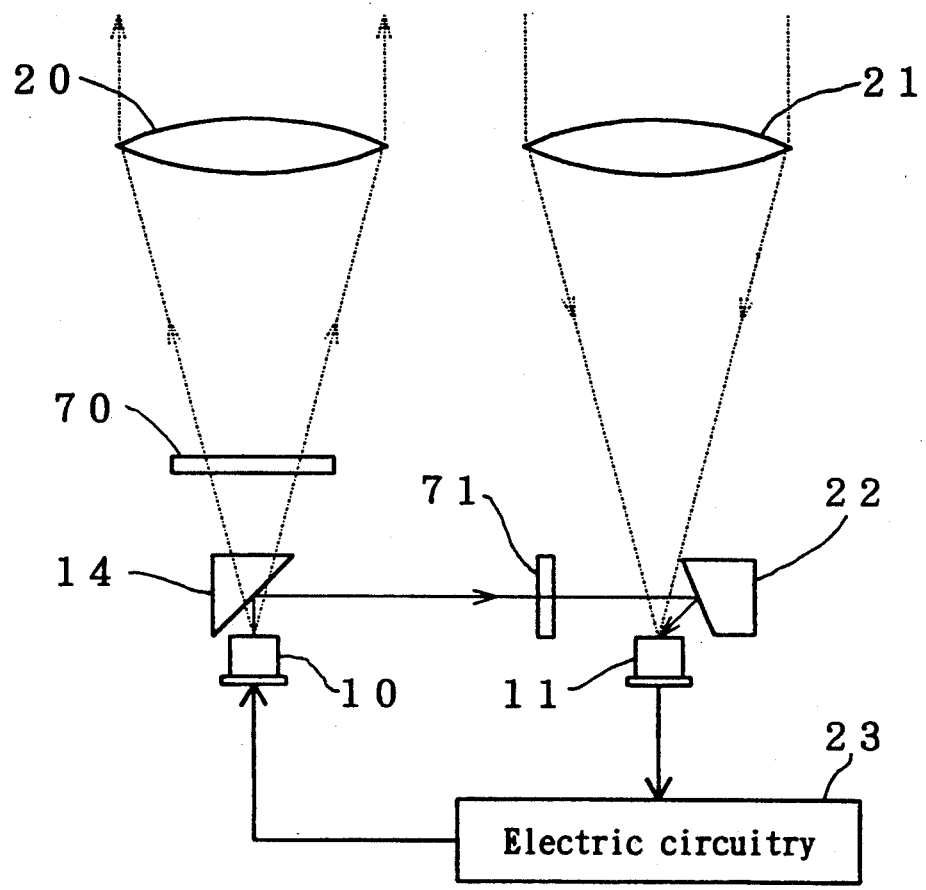
FIG. 17 is a schematic side view of a fourth embodiment of the EDM with a third modified optical path switching shutter.
Figure 18:
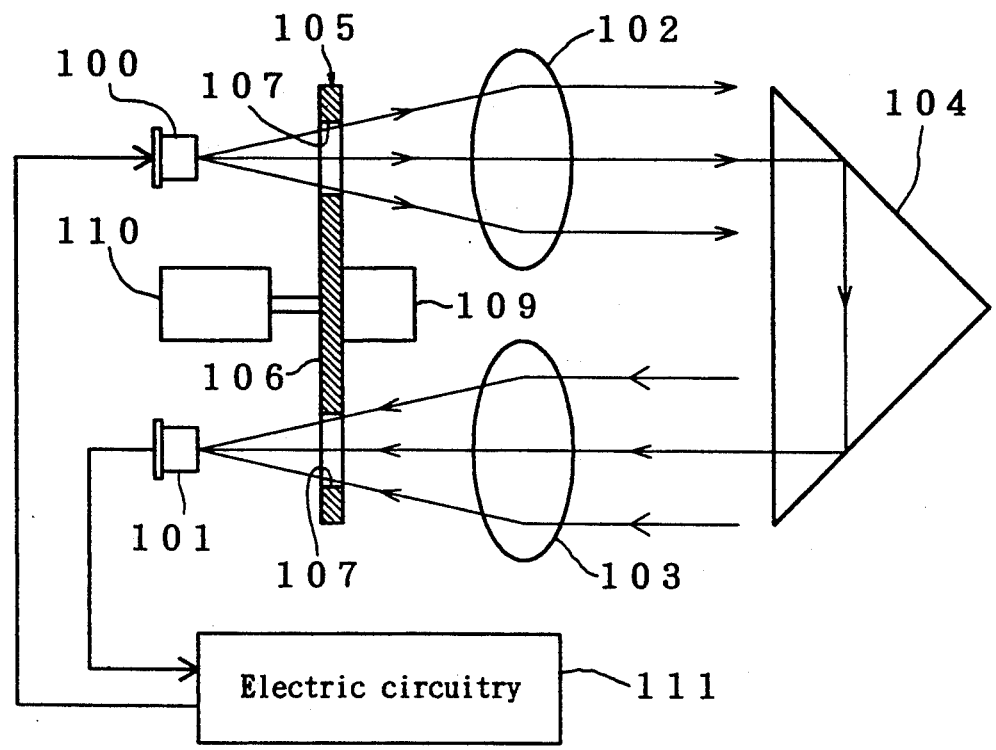
FIG. 18 shows the construction of a conventional and typical Electro-optical Distance Meter.
Figure 19:
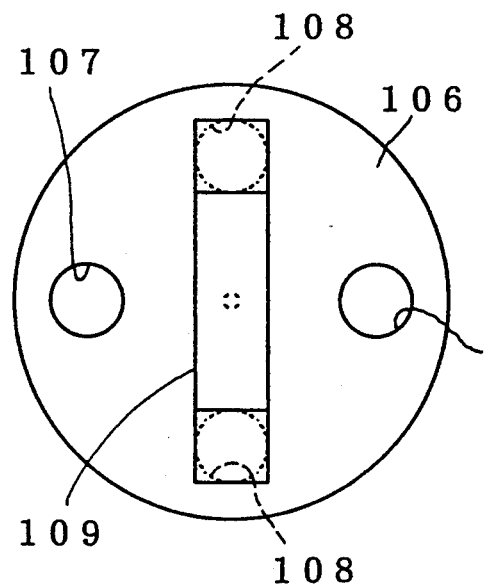
FIG. 19 is a plan view showing the displacement of the optical paths switching shutter shown in FIG. 18.
Figure 20:
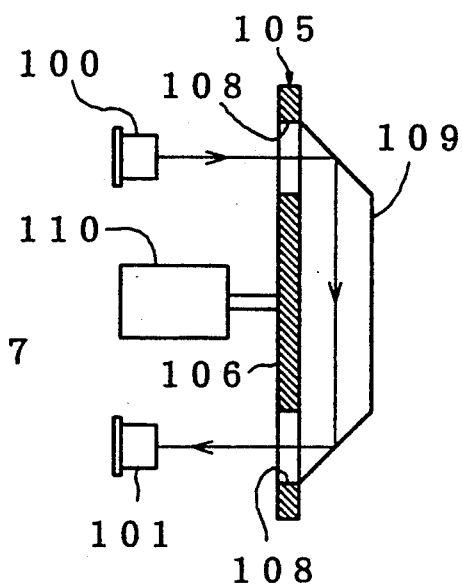
FIG. 20 is a side view, partially in cross-section, of the major portion of the EDM in which the disc 106 is rotated by 90° from the position of FIG. 18.
Figure 21:
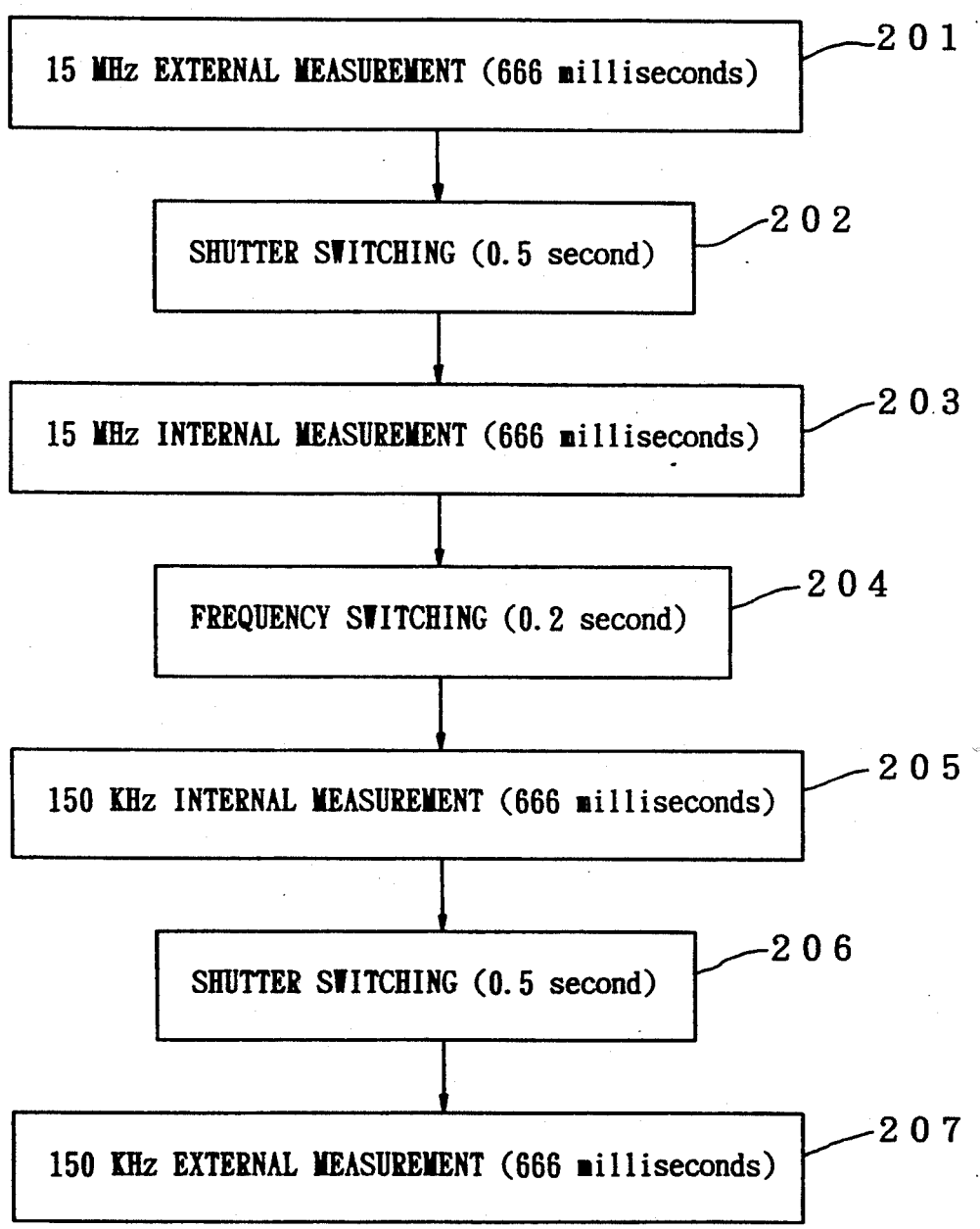
FIG. 21 is a flow chart explaining the measuring operation of the EDM as shown in FIG. 18.

FIG. 17 is a schematic view of a fourth embodiment of the EDM having Liquid Crystal Device (LCD) shutters 70 and 71. The external measurement's shutter 70 is disposed between the light-emitting element 10 and the object lens 20. The shutter 70 is also disposed perpendicular to the common optical axis of the light-emitting element 10 and the object lens 20. The internal measurement's shutter 71 is disposed between the dichromic mirror 14 and the reflector 22 in alignment with another common axis thereof.

Upon the external measurement, the LCD shutter 70 is energized by an electric potential to be "ON" or a transparent condition while the LCD shutter 71 is free from the energy of the electric potential to be "OFF" or in an opaque condition. The major light beam from the element 10 is passed through the half mirror 14, LCD shutter 70 and object lens 20. The minor beam is shielded by the second shutter 71 after being reflected by the half mirror 14.

Upon the internal measurement, the LCD shutter 70 is free from the energy of the electric potential to be "OFF" or in an opaque condition while the LCD shutter 71 is energized by the electric potential to be "ON" or in a transparent condition. The major light beam from the light-emitting element 10 is shielded with the shutter 70 after passing through the half mirror 14 while the minor beam is directed to the photo-detector 11 via the half mirror 14, LCD shutter 71 and reflector 22.

As the potential applying time for the LCD shutters 70 and 71 is selective, the time ratio of the external to internal measuring time can be preferably selected without inherent disadvantages of the mechanical means such as the motor.

The above embodiments describe the optical path switching shutter that the angular range of its opening for the external measuring is set to be 300° and that the angular range of its opening or groove for the internal measuring is set to be 30° to produce the time ratio of the external measuring time to the internal measuring time of 10 to 1. Those values of the shutter are only exemplary, and other time ratios may be selected.

As described above, according to the Electro-optical Distance Meter of the present invention, the time ratio of the external measuring time to the internal measuring time per one measuring cycle is set to be any ratio. Before the essential measurement, only the internal measurement is performed and its data having the number corresponding to the time ratio or its integral times are stored in the memory. In the essential measurement, the internal measurement data is updated in the internal measurement memory for the measurement cycle to provide the transferring average of the internal measurement to calibrate the average of the external measurement with this transferring average. Therefore, a high reliable net measurement is obtained in the short measuring time.

According to the optical shutter of the present invention, as the external and internal measuring modes are continuously switched, not intermittently, the measuring cycle is reduced, and consequently, the total measuring is reduced. Therefore, the measurement can trace the moving target with high reliability.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

What is claimed is:

1. An electro-optical distance meter for measuring an external optical path comprising:
    a light-emitting element for emitting modulated light to a target; a lens in optical alignment with said light-emitting element and said target providing an external optical path;
    a photo-detector element in optical alignment with said target for receiving return light from said target through another lens for providing an external return optical path;
    an internal optical path having a predetermined length and being used for calibrating said external optical path to be measured;
    a continuously rotating shutter disposed in said external and internal optical paths for switching between said external and internal optical paths, said shutter comprising a rotating disc having a C-shaped opening and an index corresponding to a leading angular position of said C-shaped opening;
    a dichroic means disposed in alignment with said shutter having a predetermined inclined angle to the axis of said light-emitting element;
    a stationary means for detecting said index of said rotating disc; and
    an electric control means operatively connected to said light-emitting and photo-detector elements and stationary means for performing measurements of said external and internal optical paths in a predetermined time ratio.

2. A meter as described in claim 1, in which said shutter further comprises a cylindrical member carried by said disc having a rectangular opening provided between 165° to 195° thereon used in said internal optical path measurement.

3. A meter as described in claim 1, in which said C-shaped opening formed within two concentric rings has a predetermined angular range used in the external optical path measurement; and a truncated conic sector being mounted at the remaining portion of said concentric rings in alignment with the rotating axis on the face of said disc oppose said light-emitting element.

4. A meter as described in claim 3, in which said truncated conic sector is made from a truncated conic ring material or glass, on which a high reflective material or vapor is applied or deposited.

5. A meter as described in claim 1, in which said C-shaped opening has a predetermined angular range provided within two concentric rings, a groove on said disc at the remaining sector of said C-shaped opening in alignment with the outer ring of said two concentric rings and a stationary mask disposed in front of said rotating shutter, said mask having a semicircular opening in alignment with said C-shaped opening, said semicircular opening having a straight side perpendicular to and in contact with the common optical axis of said light-emitting element, lenses, and photo-detector element, and another opening, said internal optical path measurement being provided on said mark corresponding to said groove.

6. An electro-optical distance meter for measuring an external optical path comprising:
   a light-emitting element for emitting modulated light to a target;
   a lens in optical alignment with said light-emitting element and said target providing an external optical path;
   a photo-detector element in optical alignment with said target for receiving return light from said target through another lens for providing an external return optical path;
   an internal optical path having a predetermined length and being used for calibrating said external optical path to be measured;
   a first stationary shutter disposed between said light-emitting element and said lens for switching said external optical path by an electric potential means;
   a dichroic means disposed in optical alignment with said first shutter having a predetermined inclined angle to the axis of said light-emitting element;
   a reflector in optical alignment with said dichroic means in said internal optical path;
   a second stationary shutter disposed between said dichroic means and said reflector in optical alignment in said internal optical path for switching said internal optical path by another electric potential means; and
   an electric control means operatively connected to said light-emitting and photo-detector elements and first and second stationary shutters for performing measurements of said external and internal optical paths in a predetermined time ratio.

7. A meter as described in claim 6, in which said first and second stationary shutters are Liquid Crystal Device shutters.

8. A meter as described in claim 1, in which said shutter comprises a disc connected to a rotatable shaft at its center and having a cylindrical member with a rim secured or integrated with its periphery.

9. A meter as described in claim 1, in which said target carries a triangular prism.

10. A meter as described in claim 3, in which said opening is started from a 30° angular position of said disc and terminated to its 330° position to provide a 300° arc.

11. A meter as described in claim 3, in which said opening is started from a 20° angular position of said disc and terminated to its 340° position to provide a 320° arc.

* * * * *